United States Patent [19]

Otte et al.

[11] 4,376,704
[45] Mar. 15, 1983

[54] VACUUM DOUBLE DRUM FILTER

[75] Inventors: Wilhelm Otte; Reinhold Winckowski, both of Bochum, Fed. Rep. of Germany

[73] Assignee: Klöckner-Humboldt-Deutz AG, Fed. Rep. of Germany

[21] Appl. No.: 245,611

[22] Filed: Mar. 19, 1981

[30] Foreign Application Priority Data

Mar. 20, 1980 [DE] Fed. Rep. of Germany ....... 3010682

[51] Int. Cl.³ .............................................. B01D 33/06
[52] U.S. Cl. .................................... 210/326; 210/404; 209/288
[58] Field of Search ............... 210/386, 326, 402, 404, 210/217; 209/288, 289

[56] References Cited

U.S. PATENT DOCUMENTS

| | | | |
|---|---|---|---|
| 2,696,309 | 12/1954 | Bultman | 210/404 |
| 3,363,774 | 1/1968 | Luthi | 210/404 |
| 3,482,375 | 12/1969 | Ellingen | 55/151 |
| 3,638,797 | 2/1972 | Heckmann | 210/393 |
| 4,102,791 | 7/1978 | Otte | 210/326 |
| 4,157,301 | 6/1979 | Wegener | 210/404 |
| 4,211,653 | 7/1980 | Koppe et al. | 210/77 |

FOREIGN PATENT DOCUMENTS 2506527 8/1976 Fed. Rep. of Germany ...... 210/404

*Primary Examiner*—Benoît Castel
*Attorney, Agent, or Firm*—Hill, Van Santen, Steadman, Chiara & Simpson

[57] ABSTRACT

A double drum vacuum filter with drums positioned parallel to one another with a gap therebetween and rotating in opposite directions with suction applied within the foraminous drums to remove filtrate from a solid which forms on the surface with tapered extraction tubes within the drum angled at an angle greater than 90° relative to the drum surface and with stripping devices disposed on the downrunning side of the drums below the center thereof.

4 Claims, 3 Drawing Figures

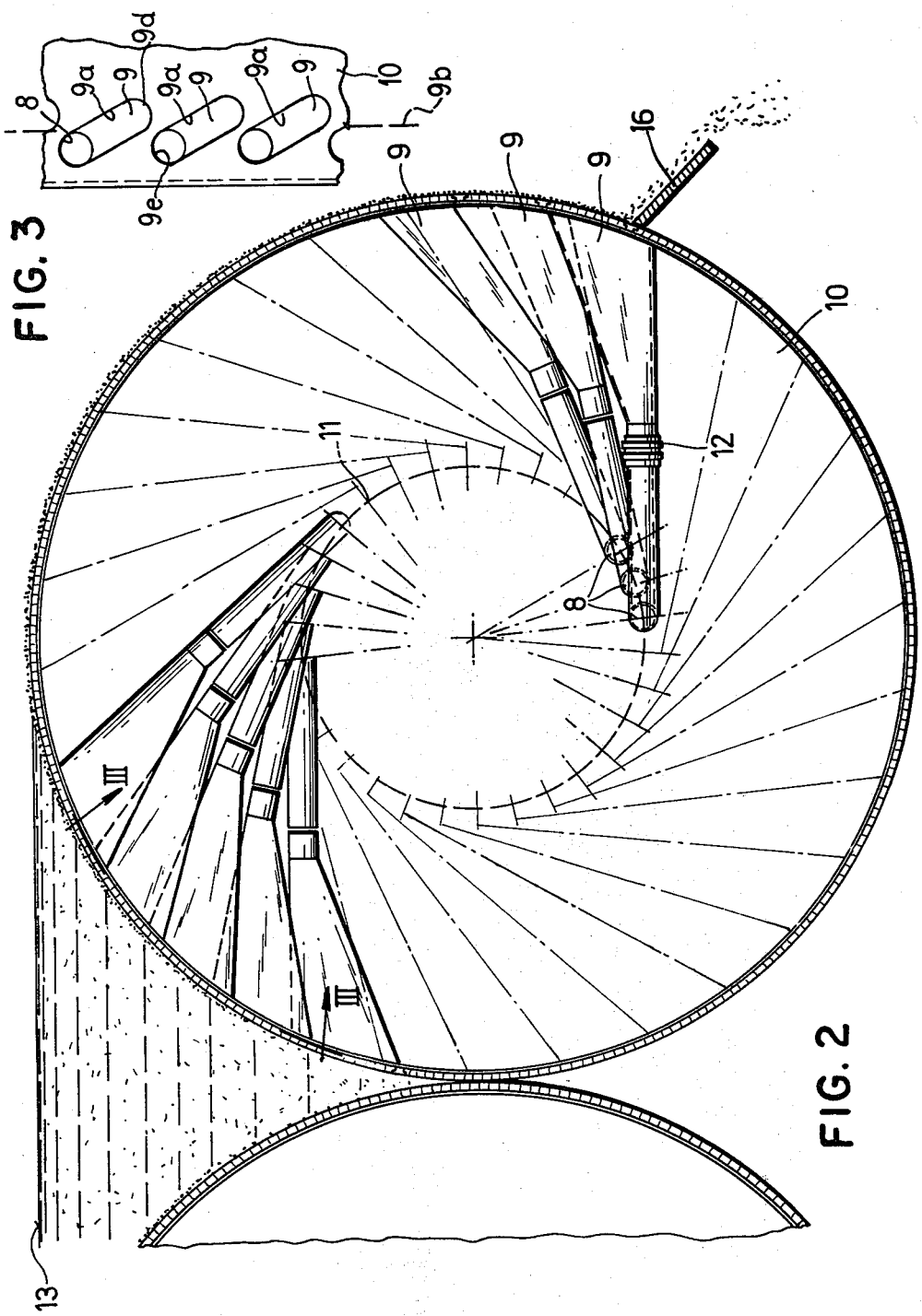

VACUUM DOUBLE DRUM FILTER

BACKGROUND OF THE INVENTION

The invention relates to improvements in vacuum double drum filters and particularly to an improved structure for removing the filtrate through the inner surface of the porous drum and improved stripping devices for the filter cake.

Double drum filters conventionally employ parallel porous horizontal drums rotating in opposite directions and positioned with their peripheral surfaces closely adjacent so that material to be filtered can be fed in the gap between them. A vacuum is applied within the filter drum to remove the filtrate and the cake forms on the outer surface and is removed from the outer surface. An example of this general type of filter is shown in U.S. Pat. No. 4,102,791, Otte, issued July 25, 1978.

Vacuum double drum filters of this general type are employed for dewatering mass flows such as in coal processing systems. In these commercial operations, the amount of filtrate which must be extracted is substantial, and it is difficult to obtain a dry filter cake.

It is accordingly an object of the present invention to provide an improved double drum filter with a structure capable of obtaining a more dry filter cake and avoiding disadvantages of structures heretofore available.

In accordance with the preferred form of the invention, the layering of coarse grain and fine grain in the filter cake layer is to be improved, and the suction zone is enlarged. Also, the amount of water which reenters or rewets the filter cake is reduced so that the water flowing through the porous surface of the drum is handled in an improved manner for complete removal from the zone of the filter cake.

A feature of a preferred form of the invention is that the drum diameter of the filter drum is greater than half of the drum length, and preferably greater than ¾ of the drum length. Generally, in double drum filters, the drum length is greater by a multiple of the drum diameter. It has been discovered that the dryness of the filter cake in double drum filters can be significantly and unexpectedly improved when the drum length is not significantly greater than the drum diameter and the ratio of drum length to drum diameter lies in proximity of or below 2:1.

By the foregoing preferred construction, the height of the sedimentation zone of the input slurry is significantly increased so that a better layering of the different grain sizes is produced on the drum surface and a significant increase of the drum circumference relative to the length obtains a shorter extraction pipe length. The dryness of the filter cake is increased due to both of these effects.

In accordance with the preferred form of the invention, extraction pipes are provided for the filtrate with filtrate collecting pockets which are positioned adjacent the inner surface of the rotating filter drum. The collecting pockets are disposed directly under the surface of the filter drum and increase the effective aperture of the filtrate extraction pipes and particularly at the beginning of extraction, a greater amount of water can stream into the extraction pipes.

Further, in accordance with the preferred embodiment, the filtrate collecting pockets are constructed to be wedge shaped. The wedge shape is particularly favorable since it offers advantages in fabrication technology for manufacture. Also, it offers a large suction area at the drum surface, and can be easily adapted at the inside of the transition to the filtrate extraction pipes so that the wedge shaped pockets conform to the diameter of the filtrate extraction pipes.

A further feature of the invention is that the filtrate extraction pipes and/or the filtrate collection pockets are positioned at an angle with respect to the drum surface which is not at right angles, but is at an angle to the 90° line drawn from the center of the drum to the drum surface. The filtration pockets are angled in the direction of rotation of the drum. Further, except for the initial pockets which carry the first filtered filtrate, the pockets are inclined relative to a horizontal position so that the residual filtrate cannot flow back to the filter surface, but will flow toward the center of the drum to be removed by the filtrate extraction pipes.

Another feature is that the filter cake stripping devices are disposed on the downrunning side of the drum below the center of the filter drums. This provides a greater effect of drum circumference for the extraction of the filtrate. The dryness of the filter cake is increased by this construction. It is also provided that the filtrate extraction pipes and the lower surface of the wedge shaped filtrate suction pockets converge into one another without bend so that a smooth discharge path is provided for the filtrate.

Other objects, advantages and features will become more apparent from the teaching of the principles of the invention in connection with the disclosure of the preferred embodiments in the specification, claims, and drawings.

DRAWINGS

FIG. 2 is an enlarged fragmentary view of a portion of the assembly showing the righthand drum in greater detail;

FIG. 3 is a fragmentary sectional view taken substantially along line III—III of FIG. 2.

DESCRIPTION OF THE PREFERRED EMBODIMENTS

Figure 1:
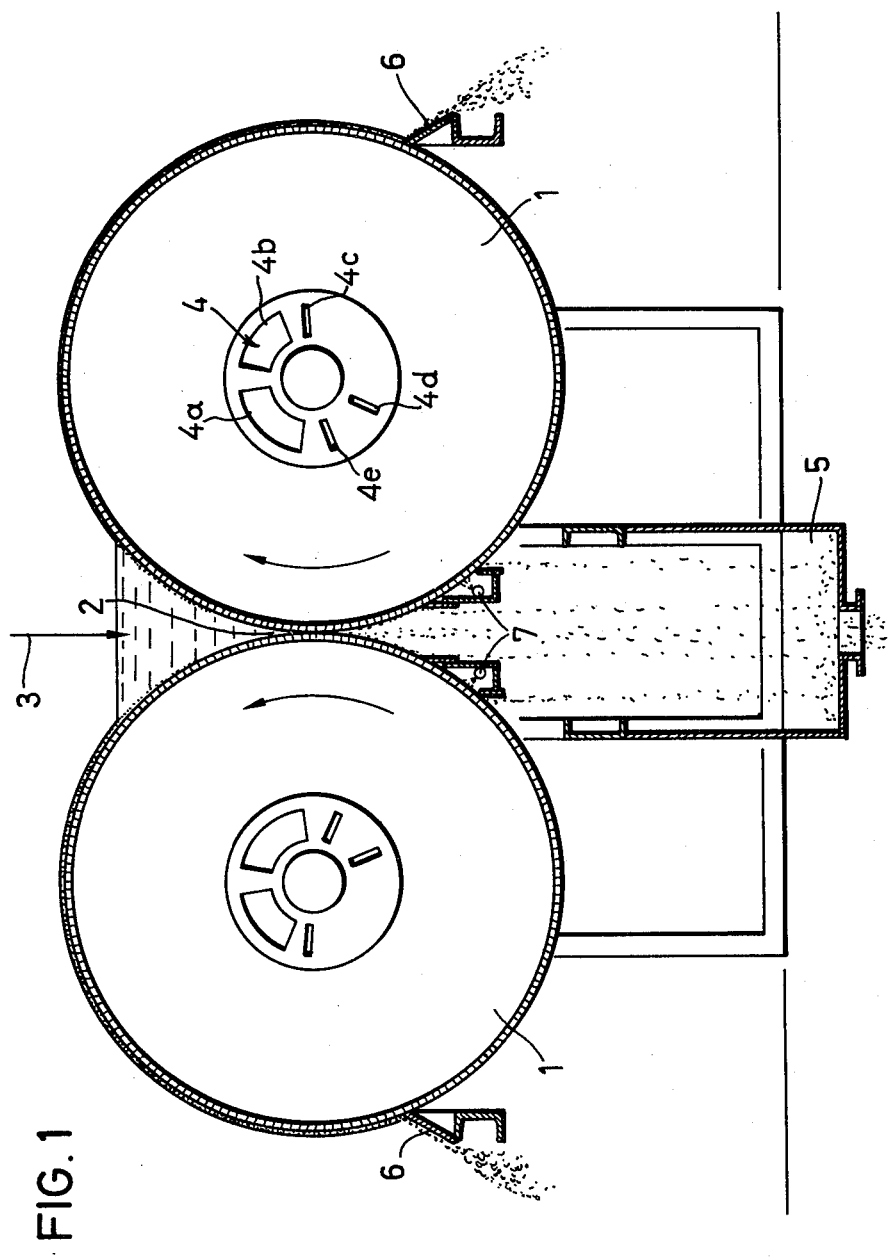
FIG. 1 is an end elevational view in section of a double drum filter constructed and operating in accordance with the principles of the present invention.

As illustrated in FIG. 1, two filter drums 1 are provided positioned horizontally parallel to each other in close proximity so as to define a working gap 2 therebetween. It is not necessary to provide a seal in the work gap 2. The gap 2 is sealed automatically due to the solids particles which precipitate onto the filter surface with constant rotation of the drums in the direction indicated by the arrowed lines.

A supply of material to be filtered is provided by suitable means indicated schematically by the arrowed line 3 with the liquid material being fed at a measured rate into the work gap 2. The filter drums are porous or foraminous cylindrical shells, and at the ends of the shells are heads 4. The heads are provided with suitable bearings to rotatably support the drums on a shaft and are provided with driving means. These details need not be shown inasmuch as they are conventional and will be fully understood by those versed in the art. The heads 4 are provided with openings as illustrated; the openings being connected to a controlled vacuum source for applying a vacuum to draw the filtrate out of the material and for carrying the filtrate away. As shown for the head 4, individual vacuum zones may be provided for different levels of vacuum along the peripheral inner surface of the drums, and additional openings may be provided to connect to air pressure for blowing air outwardly to clean the porous drums after the filter cake has been scraped off the surface. For example, as shown in FIG. 1, the openings 4a, 4b and 4c may be connected to vacuum sources, and these openings will communicate with the ends of the filtrate removal or filtrate extraction pipes 8 as the ends of the pipes pass the openings. Also, openings 4d and 4e may be connected to air pressure sources so that as the ends of the extraction pipes 8 pass these openings, air is blown outwardly. For this purpose the extraction pipes 8 will have an axially facing opening to pass the gland openings 4a through 4e, and the pipes will be suitably mounted by supporting mechanism, not shown, within the drums.

At the outer ends of the filtrate extraction pipes 8, are wedge shaped pockets 9 which are hollow with the outer open ends facing the surface of the drum shell, and the hollow pockets lead to the pipes 8 through connection means 12.

As the drums rotate and the filter cake is collected on the outer surface, it is carried downwardly past a stripping device 6 which is positioned on the downrunning side of each of the drums and below the axial center of the drums.

Past the location where the cake is stripped off of the drums is located sprays or cleansing devices 7 which help clean the outer surface of the drum. Below the location of these cleansing devices is a slurry collecting trough 5 which receives liquid which may pass down through the gap 2 and receive the cleansing liquid delivered by the sprays 7.

FIG. 2 illustrates the location of the filtrate extraction pipes 8 and the structure and position of the filtrate collecting pockets 9. The pipes are positioned radially displaced from the center of the drums on a circle shown by the broken line 11. The pipes lead radially inwardly from the connector 12 and have a gentle sweeping elbow to lead to the openings which communicate with the ports 4a through 4e.

The stripping device 16 is positioned so that the extraction pipes are still inclined toward the center and do not reach their horizontal position until after the pockets have passed the stripping device 16. Above the stripping device, the pipes 8 and the pockets slope downwardly toward the center of the drum for gravity flow to aid the removal of filtrate. With this construction, residual filtrate does not flow back outwardly to rewet the filter cake. The filtrate collection pockets are shaped to extend axially along the inner surface of the drum shell and may be continuous along the axial length, extending at a slight angle to the shell or a plurality of pockets may be provided along the axial length each connecting to the filtrate extraction pipes 8. The pockets 9 are wedge shaped and each connect to the pipes 8 by a socket joint 12.

In accordance with the preferred form of the inventive structure with the arrangement of the pockets 9, being wedge shaped and extending in a downward direction and also angled at an angle to a right angle or radial line, the removal of the filtrate is enhanced. The movement of the filtrate in the direction of rotation of the drum and the inertia thereof carries it into the pockets with a velocity vector extending in the direction of the angle of the pockets. This provides for a smoother flow of filtrate and better removal taking advantage of the inertia of the liquid. This arrangement in conjunction with the enlarged diameter of the drum, and the location of the stripping device improves the filtering process and provides a better product than available with structures heretofore known.

In a preferred arrangement, the concepts are applicable to double drum filters, but certain features may be used with equal effectiveness on single drum filters.

As will be appreciated by those versed in the art, the filtrate extraction pipes 8 will lead to a suitable means for intermittently connecting the pipes 8 to the ports 4a through 4e. Such device may comprise two circular plates with the plate containing the ports 4a through 4e being stationary and another circular plate having axial holes therein in sealing, sliding relationship with the head or plate 4. The plate with the holes which rotates with the drum has the holes spaced so that each hole communicates with one of the extraction pipes 8. Then as the drum rotates, the plate with the holes rotates past the ports 4a through 4e so that the pipes 8 are successively exposed or in communication with the suction ports 4a through 4e. This type of connection is known to the art and need not be shown or described in further detail. At the outer receiving ends of the collecting pockets 9, the pockets are elongate as shown in FIG. 3. The entry end for the pockets is an elongate opening 9a which is skewed or slanted with respect to a radial plane 9b perpendicular to the axis of the drum. This skewed arrangement permits the pocket openings 9a to be larger in size, and the skewed arrangement improves drainage from the drum surface into the pockets. Further, the length of the pockets openings 9a is such that they overlap. That is, the end 9d of one pocket will circumferentially extend to or slightly overlap the end 9e of an adjacent pocket as shown in FIG. 3. Thus, as filtrate flows axially toward the pockets, it will be extracted into a pocket without having to change its course of flow to a circumferential direction. This construction combined with the angular arrangement of pockets and pipes improves the operation and capacity of the filter and improves the operational efficiency thereof.

We claim as our invention:

1. A vacuum double drum filter comprising in combination:
   a pair of parallel porous rotational filter drums in close running relationship forming an upwardly facing working gap between them for receiving material to be filtered;
   means for delivering material to said working gap;
   vacuum extraction tubes within each drum for carrying away filtrate, said tubes having inner ends for discharging to a vacuum source through a central head of each drum and said inner end being located radially displaced from the center of the respective drum so that the tubes are angled in the direction of drum rotation; and
   wedge shaped collecting pockets tapered gradually and uniformly from an outer opening to an inner opening with the outer opening against the inner surface of the drums facing the material in the working gap and leading radially inwardly to the inner opening connecting to said tubes,
   said pockets extending at an angle to a radial line from each drum center to the location of the open opening to be angled in the direction of rotation of each drum.

2. A vacuum double drum filter constructed in accordance with claim 1:
   wherein said inner ends are located on a circle having its center coincident with the center of the respective drum.

3. A vacuum double drum filter constructed in accordance with claim 1:
   wherein the pockets connect to the tubes by socket connections.

4. A vacuum double drum filter constructed in accordance with claim 1:
   wherein said outer openings are elongate and overlap each other in a circumferential direction to provide a flow path continuous in a circumferential direction for axially and radially flowing filtrate.

* * * * *